United States Patent [19]

Reynders

[11] Patent Number: 5,569,382
[45] Date of Patent: Oct. 29, 1996

[54] BELT FILTER DEVICE HAVING A CLEANING SPRAY HEAD

[75] Inventor: Luc Reynders, Riemst, Belgium

[73] Assignee: Filterwerk Mann & Hummel GmbH, Ludwigsburg, Germany

[21] Appl. No.: 247,223

[22] Filed: May 23, 1994

[30] Foreign Application Priority Data

Jun. 19, 1993 [DE] Germany .................. 43 20 387.6

[51] Int. Cl.⁶ .................................................. B01D 33/04
[52] U.S. Cl. ........................ 210/391; 210/400; 210/406
[58] Field of Search ..................................... 210/400, 406, 210/391, 393, 407, 408, 409, 412

[56] References Cited

U.S. PATENT DOCUMENTS

| | | | |
|---|---|---|---|
| 4,042,507 | 8/1977 | Langmack | 210/400 |
| 4,142,971 | 3/1979 | Le Fur et al. | 210/400 |
| 4,172,035 | 10/1979 | Adams | 210/400 |
| 4,390,428 | 6/1983 | Bratten | 210/400 |
| 4,514,301 | 4/1985 | Parshall | 210/400 |
| 4,661,251 | 4/1987 | Wykoff | 210/400 |
| 4,693,836 | 9/1987 | Wilson | 210/406 |
| 5,059,323 | 10/1991 | Galletti | 210/400 |
| 5,167,740 | 12/1992 | Michaelis et al. | 210/493.3 |
| 5,202,034 | 4/1993 | Martel, Jr. | 210/400 |

FOREIGN PATENT DOCUMENTS

| | | |
|---|---|---|
| 228210 | 7/1987 | European Pat. Off. . |
| 1144691 | 3/1963 | Germany . |

*Primary Examiner*—Robert J. Popovics
*Attorney, Agent, or Firm*—Evenson, McKeown, Edwards & Lenahan

[57] ABSTRACT

A belt filter device for the cleaning of contaminated liquids has an upper dirt chamber which receives the contaminated liquid. Underneath this dirt chamber, a clean chamber is arranged. Between the dirt chamber and the clean chamber, a filter bottom is provided which has a passage opening for the liquid and on which a revolving filter belt is arranged so that it can be moved along automatically as a function of the amount of contaminations deposited on it. Outside the dirt chamber, a cleaning device is arranged which removes the contaminations situated on the filter belt. The cleaning device has at least one spray head which is arranged on the rear of the filter fabric and above the level of the contaminated liquid so that the dirty cleaning liquid is supplied directly to the contaminated liquid.

9 Claims, 4 Drawing Sheets

BELT FILTER DEVICE HAVING A CLEANING SPRAY HEAD

BACKGROUND OF THE INVENTION

The present invention relates to a belt filter device for cleaning contaminated liquids, comprising an upper dirt chamber which receives the contaminated liquid, a clean chamber which is arranged underneath and receives the cleaned liquid, as well as a filter bottom which is arranged therebetween, is provided with a passage opening for the liquid and on which a revolving filter belt is arranged which can be moved along automatically as a function of the amount of contamination deposited on it, and with a cleaning device provided outside the dirt chamber which removes the contamination adhering to the filter belt.

This type of a belt filter device is known from European Patent Document EP-A 0 228 210 corresponding to U.S. Pat. No. 4,661,251, which is hereby incorporated by reference. This belt filter device operates according to the vacuum principle, with a revolving filter belt resting on the sieve bottom. Below this sieve bottom, a vacuum chamber is situated into which liquid is sucked through the filter belt. By means of the discontinuous conveying movement of the filter belt, the dirt deposited on the filter belt is conveyed via a delivery neck out of the tank for the liquid, and the dirt is removed by a filter belt cleaning device, such as a scraper or a blow-off device. Then the filter belt will travel through a washing station which washes off the residual dirt situated on the filter belt, this residual dirt being led back to the dirt chamber.

The filter belt used here is relatively large-meshed so that only dirt up to a certain grain size can be filtered out of the dirty liquid. However, when very fine dirt particles, such as grinding dust, and similar particles, must also be filtered out, a filter nonwoven must be used instead of the revolving filter belt. Such a nonwoven permits only one use and is disposed of together with the occurring dirt after the passage through the belt filter device. However, the disposal of this filter nonwoven requires high expenditures. In addition, a new roll of filter nonwovens must be inserted from time to time so that an additional monitoring is required. This type of a belt filter device is described, for example, in German Patent Document DE-GM 87 15 433. A disadvantage of such one-time filters is also the fact that a disposal presents problems.

Another disadvantage of belt filter devices comprising a washing station have been the high expenditures which were required for such a washing station. In order to achieve a sufficient cleaning and, at the same time, to ensure that the liquid which was required for the cleaning-off reached the dirt chamber, ducts for the liquid, a pump, covers and a housing had to be provided.

SUMMARY OF THE INVENTION

An object of the invention is to provide a belt filter device which is equipped with a revolving filter belt and which comprises a cleaning device of a simple construction, in which case the dirt washed off by the cleaning device is introduced directly into the dirt chamber.

This and other objects are achieved by the present invention which provides a belt filter device for cleaning contaminated liquids, comprising an upper dirt chamber which receives contaminated liquid, a clean chamber underneath the dirt chamber and which receives cleaned liquid, a filter bottom arranged between the upper dirt chamber and the clean chamber and has passage openings for liquid, a revolving filter belt on the filter bottom and which is movable along automatically as a function of an amount of contamination deposited on the filter belt, and a cleaning device, outside the dirt chamber, which removes contamination situated on the filter belt with cleaning liquid. The cleaning device has at least one spray head that sprays cleaning fluid at a rear of the filter belt and above a level of the contaminated liquid in the upper dirt chamber such that dirtied cleaning liquid is provided directly to the contaminated liquid.

One of the principal advantages of the invention is the fact that a spray head is arranged above the level of the contaminated liquid and affects the filter belt from the rear. With this arrangement, the spray head is naturally supplied with cleaned liquid. Since the spray head is arranged within the revolving filter belt, the generating of a spray, which impairs the environment of the belt filter device, is largely avoided so that high-expenditure shields or cover sheets are not required.

According to a further development of the invention, it is provided that the portion of the cleaning fluid reflected by the filter belt is returned to the clean chamber by way of a collecting groove. This has the advantage that only the liquid which is actually required for the cleaning, that is, only the liquid which passes through the filter belt and detaches the dirt from the filter belt, is used up and not the whole liquid jet emerging from the spray head. The belt filter device therefore achieves a higher efficiency.

The cleaning-off of the filter belt takes place while it is stopped. For this purpose, the spray head carries out an XY-movement. One advantage which is achieved by the cleaning-off during the stoppage is the fact that the cleaning-off speed and the cleaning-off time can be varied arbitrarily and are not dependent on the conveying speed of the filter belt.

In certain embodiments of the belt filter device according to the present invention, conveying chains are provided on both sides of the filter belt and the filter belt is fastened and guided on these conveying chains. For this purpose, the chains are provided with brackets which are suitable for fastening the filter belt in the neutral fiber of the chain; that is, in the center of the chain. By this arrangement, it is ensured that, even when the chain is deflected, no relative movement will occur between the filter belt and the chain.

According to certain embodiments of the invention, a sealing profile is provided inside the dirt chamber on both sides of the filter belt. This sealing profile may, for example, be a plastic strip which rests directly on the filter belt and is prestressed, for example, by means of springs. Thus, a good sealing is ensured between the dirt chamber and the clean chamber. During the conveying movement, the filter belt slides along under the sealing profile. It is therefore expedient to select a plastic material which has good sliding characteristics.

According to an advantageous development of the invention, the belt filter device has a V-shaped construction. So that the chain can be guided through without any problems in the lower area of the dirt chamber, deflection aids are provided there which are arranged above the chain and on which the chain is supported in this area. The chain is provided with roller bodies. This ensures a particularly smooth running of the chain.

Certain embodiments of the invention provide a tensioning device for the chain arranged in the area of the upper deflection. This tensioning device is combinable with the deflection device; that is, the deflection device is arranged in a slidable manner and is acted upon, for example, by means of a spring, with a force which ensures a continuous tensioning of the chain.

In certain embodiments of the invention, flat-spray nozzles with a flat spraying jet are used. When two nozzles are arranged next to one another, these may spray, for example, an area of a length of approximately 90 mm. The nozzles are arranged so that they can be can be moved in the X-direction as well as in the Y-direction by way of guide elements and are fastened on a revolving chain. This type of a nozzle movement permits a cleaning-off of the filter belt along its whole width. In this case, the length of the cleaned filter belt amounts to approximately 170 mm.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1A:
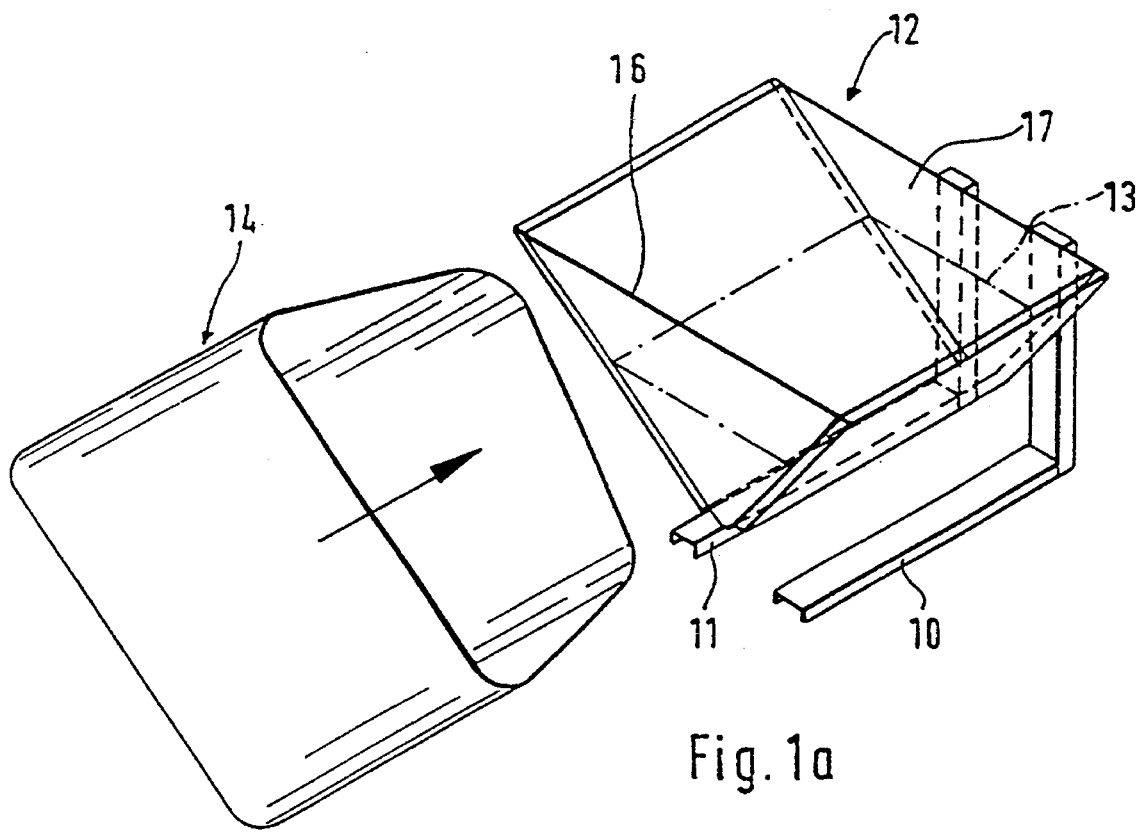
FIG. 1a is a schematic representation of a perspective view of a belt filter device constructed in accordance with an embodiment of the present invention.
Figure 1B:
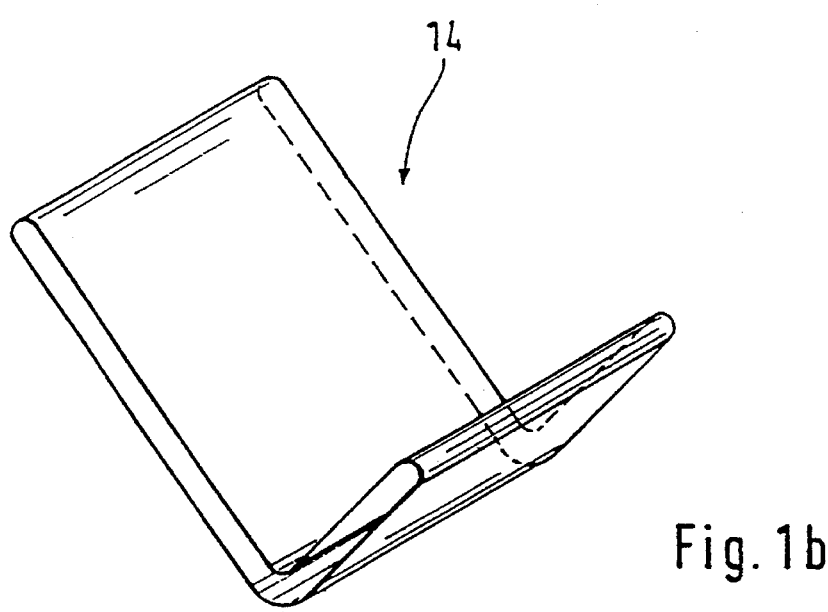
FIG. 1b is a view of the filter belt of FIG. 1a in the final installed position.

The belt filter device according to FIG. 1a comprises a stand 10, 11 to which an essentially V-shaped filter chamber 12 is fastened. Dirty liquid 13 is introduced into this filter chamber 12. For the installation of the filter belt 14, which is illustrated laterally in FIG. 1a, the dirty liquid 13 is removed from the filter chamber 12. The filter belt 14 is then pushed over the filter chamber 12 in the shown manner and is fastened on continuous chains which are not shown here and which extend on both lateral walls 16, 17. Conventionally known means, such as a timing device or differential pressure switch (not shown) are used to initiate movement of the filter belt 14, as disclosed in U.S. Pat. No. 4,661,251. In the installed position, the filter belt 14 has the shape illustrated in FIG. 1b.

Figure 2:
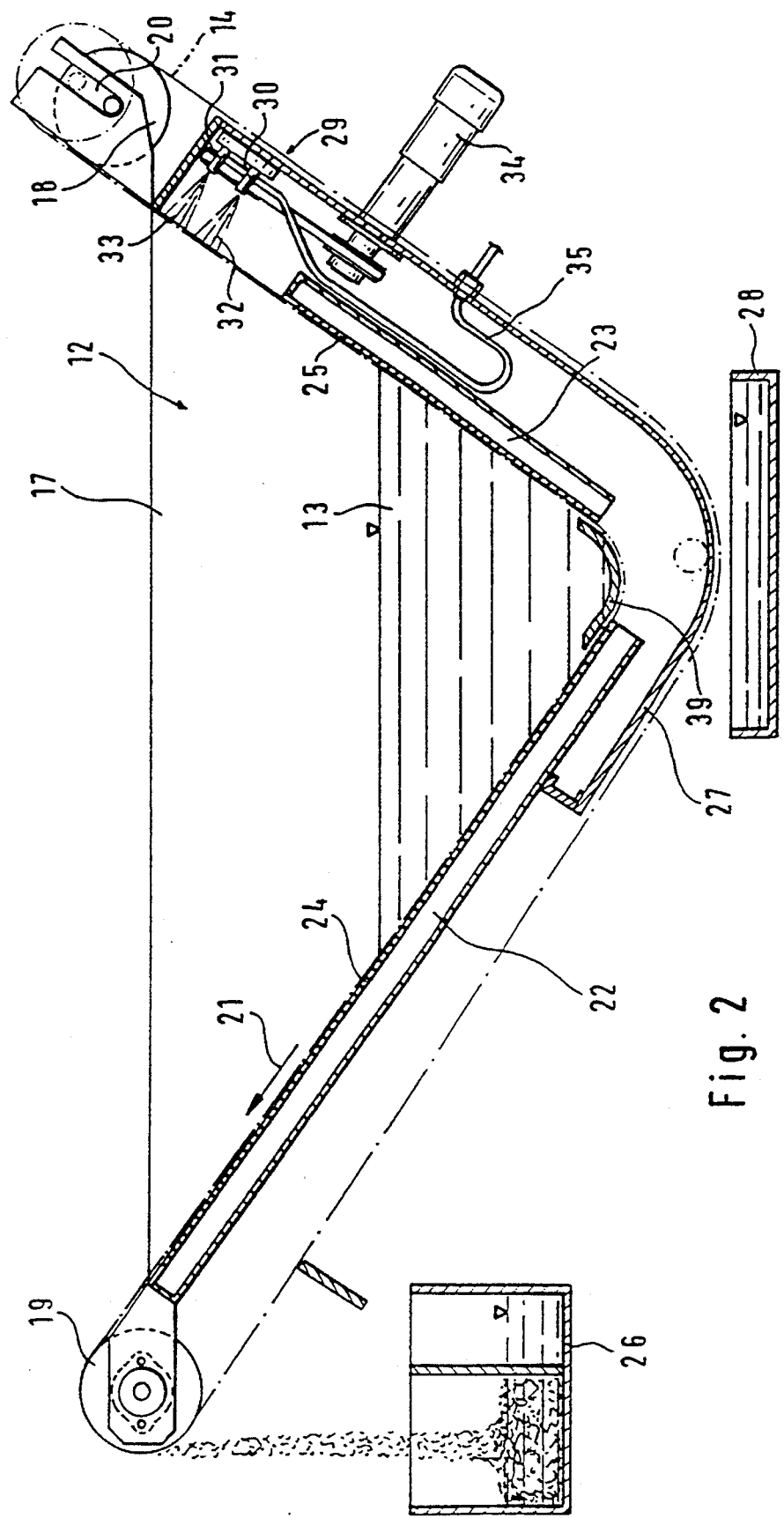
FIG. 2 is a sectional view of a belt filter device constructed in accordance with an embodiment of the present invention.

FIG. 2 is a sectional view of the belt filter device. It comprises a filter chamber 12 with the lateral wall 17. The dirty liquid 13 is situated inside the filter chamber 12. The filter belt 14 runs over deflection rollers 18, 19, the deflection roller 18 at the same time being constructed as a tensioning roller and being movable along a guide slot 20. The conveying movement of the filter belt 14 takes place in the direction of the arrow 21. Below the filter belt 14, sieve bottoms or perforated bottoms 24, 25 are arranged in the area of the clean-liquid chambers 22, 23. The filter belt 14 rests on these sieve bottoms or perforated bottoms 24, 25. The dirt held back by the filter belt 14 arrives on the outside of the filter device by way of the deflection roller 19 and falls off the filter belt 14 there into an available container 26 or is removed from the filter belt 14 by a scraper. The filter belt 14, which at first is still uncleaned, travels back below the filter chamber 12 and arrives back in the area of the filter chamber 12 by way of the deflection roller 18. The clean-liquid chambers 22, 23 guide the liquid into the funnel 27. The liquid runs laterally out of the funnel into the clean tank.

A receiving pan 28 is situated in the lower area of the belt filter device. In this receiving pan 28, the liquid is collected which drips off the filter belt 14 and is guided into the clean tank while being filtered by way of an arranged filter belt. A cleaning device 29 is arranged between the returning portion of the filter belt 14 and the portion of the filter belt 14 travelling into the filter chamber 12. This cleaning device 29 comprises, for example, two nozzles 30, 31 which each generate a spray jet 32, 33 in the direction of the filter belt 14. The spray jet cleans the filter belt 14, as it were, from below. The dirt particles are washed out upwards and arrive directly in the dirty liquid 13. The liquid reflected by the filter belt 14 which contains no dirt particles can be introduced into the clean-liquid chamber 23.

The two nozzles 30, 31 are moved by a motor 34 in the X- and Y-direction under the filter belt 14. For supplying the nozzles with cleaning liquid, a flexible hose 35 is provided which, by means of a pump not shown here, is supplied with the corresponding liquid, normally the cleaned liquid taken out of the belt filter device.

Figure 3:
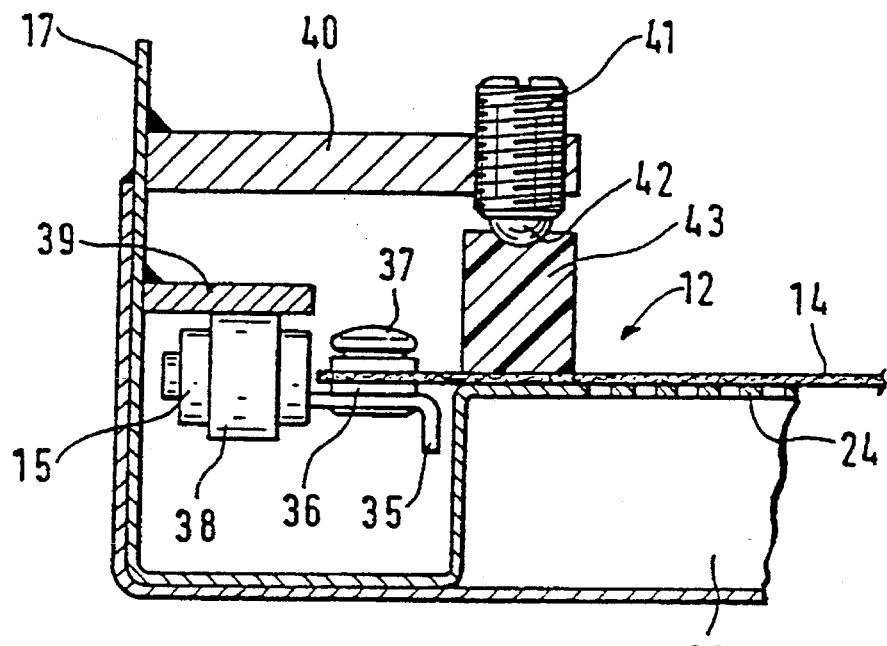
FIG. 3 is a representation of a detail of the fastening of the filter belt on a continuous chain.

The representation of the detail according to FIG. 3 shows the sealing-off of the clean-liquid chamber 22 with respect to the filter chamber 12 and of the dirty liquid 13 contained in it in the area of the lateral wall 17. The filter belt 14 rests on the perforated bottom 24 and, in the area of the lateral walls, is clipped to the continuous chain 15. For this purpose, the continuous chain 15 has brackets 35 within certain distances. These brackets 35 are provided with fastening buttons 36. The filter belt 14 is placed on these fastening buttons 36 and is fixed by way of insertable holding buttons 37. The fastening of the filter belt 14 and also the removal of the filter belt can be carried out without special devices should this filter belt 14 have to be replaced. The continuous chain 15 is constructed as a roller chain. Rollers 38 are supported in the lower area of the filter chamber 12 on a deflection aid 39.

A support 40 is situated above the chain and the filter belt 14. Ball-type contact pressure elements 41 are arranged on the support 40. By way of balls 42, these ball-type contact pressure elements 41 apply a force onto a plastic profile 43 which rests on the filter belt 14 by means of its lower surface. As a result of this measure, a reliable sealing-off is achieved between the dirty liquid 13, which is also situated in the area of the continuous chain 15, and the clean-liquid chamber 22.

Figure 4:
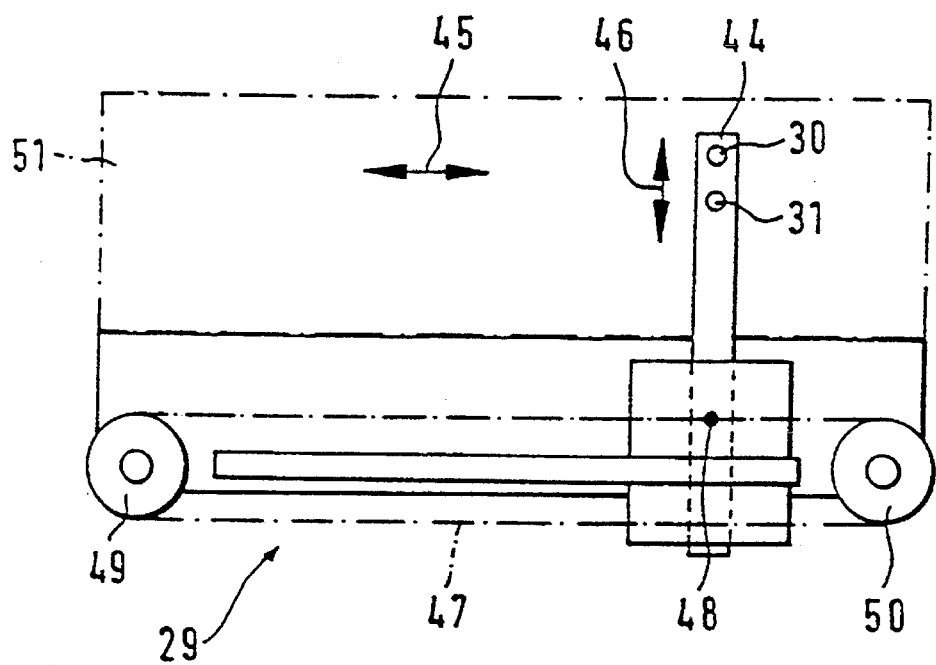
FIG. 4 is a schematic representation of a device for moving the spray head in accordance with the present invention.

FIG. 4 is a schematic representation of the cleaning-off device 29. The nozzles 30, 31 are arranged on a traverse 44. This traverse 44 can be moved in the direction of the arrow 45 as well as in the direction of the arrow 46 and is fastened on a chain 47 by way of the fastening point 48. The chain travels over the chain wheels 49, 50. As a result, the fastening point 48 travels along the arrow 45 and the nozzles 30, 31 clean the filter belt along its width. At the same time, the fastening point 48 and therefore also the nozzles travel along the arrow 46 because of the deflection of the chain 47 by way of the chain wheels 49, 50 so that, on the whole, the field 51 of the filter belt is cleaned off. This arrangement operates very reliably and can, in particular, also be used where it is subjected to sprays or liquids.

Figure 5:
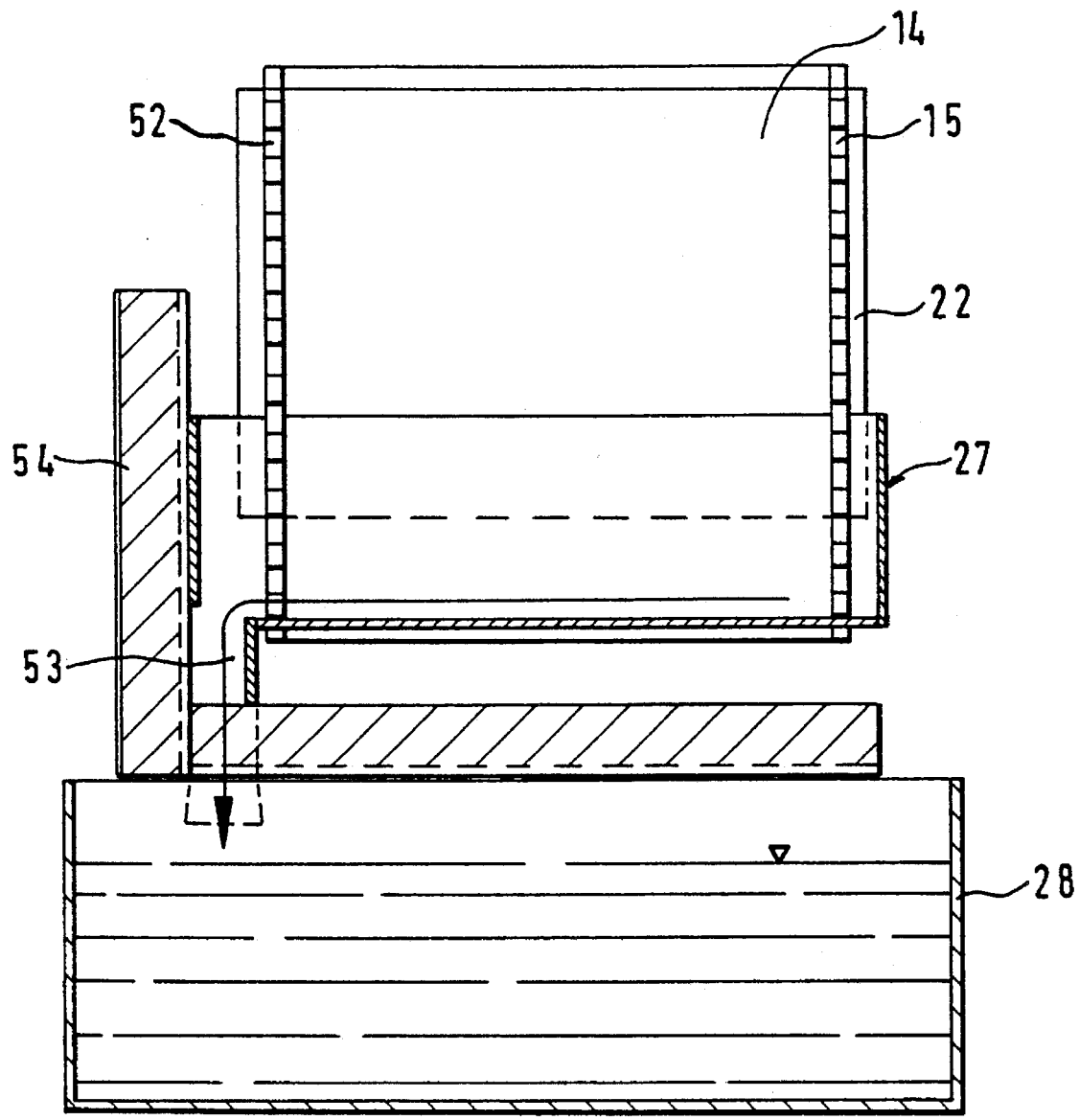
FIG. 5 is a schematic lateral view of the belt filter device of the present invention.

FIG. 5 is a schematic lateral view of the filter device. The filter belt 14 is fastened to the two chains 15, 52. The clean-liquid chamber 22 is situated laterally of the filter belt 14. A funnel 27 is arranged under this chamber. The filtered liquid, which collected in the funnel 27, flows by way of a liquid drain 53 into the receiving pan 28 which receives the clean liquid. The filter device with the filter belt 14, the chains 15, 52 and the liquid tanks is fastened on one side to a stand 54. As a result, the filter device is freely accessible from one side and the continuous filter belt 14 can be exchanged in a simple manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A belt filter device for cleaning contaminated liquids, comprising:

an upper dirt chamber which receives contaminated liquid;

a clean chamber underneath the dirt chamber and which receives cleaned liquid;

a filter bottom arranged between the upper dirt chamber and the clean chamber and which has passage openings for liquid;

a revolving filter belt adjacent the filter bottom and which is movable along automatically as a function of an amount of contamination deposited on the filter belt a cleaning device, outside the dirt chamber, which removes contamination situated on the filter belt with cleaning liquid;

wherein the cleaning device has at least one spray head that sprays cleaning fluid at a rear of the filter belt and above a level of the contaminated liquid in the upper dirt chamber such that at least some of the cleaning fluid is reflected by the filter belt toward the rear of the filter belt and is guided by a funnel into the clean chamber and such that dirtied cleaning fluid which passes through the filter belt to a front of the filter belt is provided directly to the contaminated liquid.

2. A belt filter device according to claim 1, further comprising a driving mechanism coupled with at least one spray nozzle of the spray head, the driving mechanism being displaceable parallel to a direction of movement of the filter belt and laterally to the direction of movement of the filter belt above a surface of the filter belt.

3. A belt filter device according to claim 1, wherein the filter belt is a revolving continuous filter belt, and further comprising a continuous chain which conveys the revolving continuous filter belt, brackets that fasten the filter belt on the continuous chain with the filter belt being capable of being buttoned into these brackets, wherein the brackets are arranged such that the filter belt is arranged in a center of the chain.

4. A belt filter device according to claim 3, further comprising a sealing profile which extends along the dirt chamber and contact pressure elements which exercise a force on the sealing profile in the direction of the filter belt to provide a sealing-off of the dirt chamber from the clean chamber.

5. A belt filter device according to claim 1, wherein the dirt chamber is a substantially V-shaped chamber having a lower area, and further comprising deflection aids arranged in the lower area of the V-shaped chamber on which the filter belt is supported.

6. A belt filter device according to claim 3, further comprising a tensioning device for the continuous chain and the filter belt and which is provided in a deflection area above the level of the contaminated liquid.

7. A belt filter device according to claim 6, wherein the tensioning device comprises a deflection device upon which the filter belt is supported.

8. A belt filter device according to claim 1, wherein the spray head has two nozzles for the cleaning of the filter belt, these nozzles being arranged next to one another and each spraying a strip of the filter belt with slightly overlapping spray areas.

9. A belt filter device according to claim 8, wherein the two nozzles are displaceable parallel to a direction of movement of the filter belt and laterally to the direction of movement of the filter belt and are fastened to a revolving chain which is deflected on the sides of the filter belt by chain wheels.

\* \* \* \* \*